F. E. DAVIDSON.
PISTON RING.
APPLICATION FILED MAR. 31, 1915.

1,172,678.

Patented Feb. 22, 1916.

WITNESSES:

INVENTOR
Frank E. Davidson
BY
Isaac B. Owens
ATTORNEY

UNITED STATES PATENT OFFICE.

FRANK E. DAVIDSON, OF NEW YORK, N. Y.

PISTON-RING.

1,172,678. Specification of Letters Patent. Patented Feb. 22, 1916.

Application filed March 31, 1915. Serial No. 18,214.

*To all whom it may concern:*

Be it known that I, FRANK E. DAVIDSON, a citizen of the United States, and a resident of the borough of Manhattan, city, county, and State of New York, have invented certain new and useful Improvements in Piston-Rings, of which the following is a description in such full, clear, and exact terms as will enable any person skilled in the art to which it pertains to make and use the same.

My invention relates to an improvement in piston rings intended particularly for gas and other internal combustion engines but useful on all pistons as will be apparent from the following description.

The special object of my invention is to construct a ring so that it will resist high pressures and prevent the explosion in the engine from driving the gas past the piston on the working stroke thereof and also to construct a ring which is easily applied to and removed from the piston and that will stay in position when the cylinder is removed from the piston. I attain this end by means of a peculiar construction which is illustrated in the accompanying drawings and which will now be specifically described.

Figure 1:
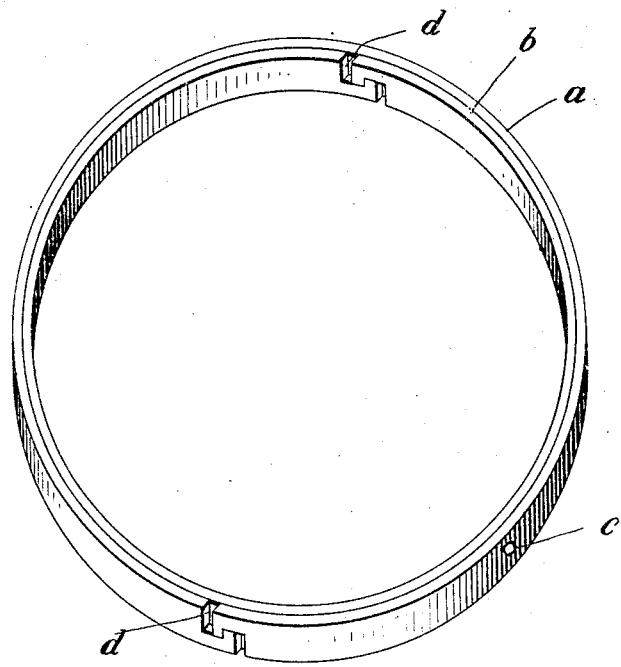
Figure 2:
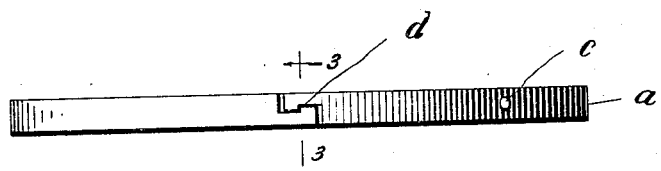
Figure 3:
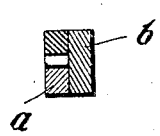
Figure 5:
Figure 4:
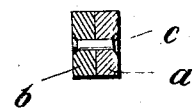

In these drawings Figure 1 is a side view showing the two parts of the ring as used in operation; Fig. 2 is a perspective view of the same ring; Fig. 3 is a cross section on line 3—3 of Fig. 2; Figs. 4 and 5 are cross sections showing the pin or rivet connecting the parts of the ring.

Referring to Fig. 1, the piston ring is composed of two parts *a* and *b*. Each part consists of a metal ring. These rings *a* and *b* are resilient, circular in form and of different diameters so that when in use one lies outside of the other in true concentric arrangement. The rings do not form complete circles but are slightly separated at their ends by gaps *d* which consist of sliding interlocking lap joints. The ends of one ring overlap the ends of the other and the rings are held together by means of a rivet *c* in the inner ring which fits into a hole in the outer ring so that the two rings *a* and *b* form the piston ring. These parts *a* and *b* are put together when in operation so that the rivet *c* fits into the hole in the outer ring and the gaps *d* in the outer ring and the inner ring are held apart when in common use so that at no time will they register, thus preventing any escape of gas or steam past the piston. It should be noted that the result of this arrangement is that the rings *a* and *b* which compose the piston ring may expand and contract to keep the ring tight against the cylinder walls. At the same time it is impossible for the gaps to register. This insures that there be at no time any passage past which the gas can leak, the ring always presenting an unbroken circumferential surface. The ends of the interlocking joints hold the rings together so that when the ring is on the piston and the cylinder is placed over the piston the rings will enter the cylinder readily owing to the usual chamber at the base of the cylinder without breaking or separating. When removing the cylinder from the piston the interlocking joints will hold the rings in position in the slot, so that the cylinder can be replaced without removing the rings or necessitating holding them in place.

Having thus described my invention, what I claim is new and desire to secure by Letters Patent of the United States is:—

A piston ring composed of two expansive and contractive split-parts lying concentrically one around the other and having their joints or splits located at points removed from each other, the split ends of the said parts having sliding interlocking lap joints to limit their expansive and contractive movement and means for fastening said parts together at a point intermediate said joints.

In testimony whereof I have hereunto signed my name in the presence of two witnesses.

FRANK E. DAVIDSON.

Witnesses:
 PATRICK A. BOLGER,
 ENDA TANNER.